Figure 3:
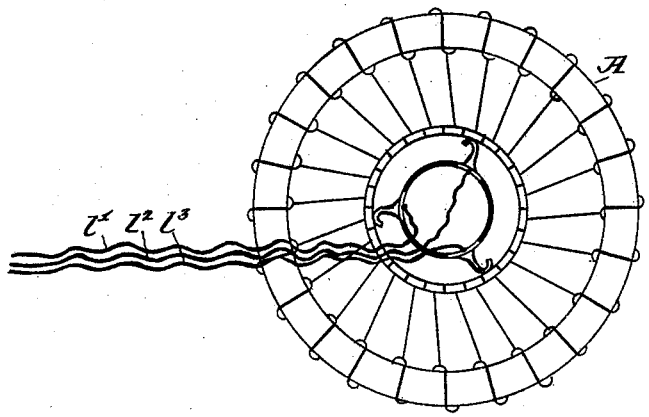

(No Model.)  2 Sheets—Sheet 1.
F. S. HUNTING.
ALTERNATING CURRENT ELECTRIC MOTOR.
No. 568,350. Patented Sept. 29, 1896.
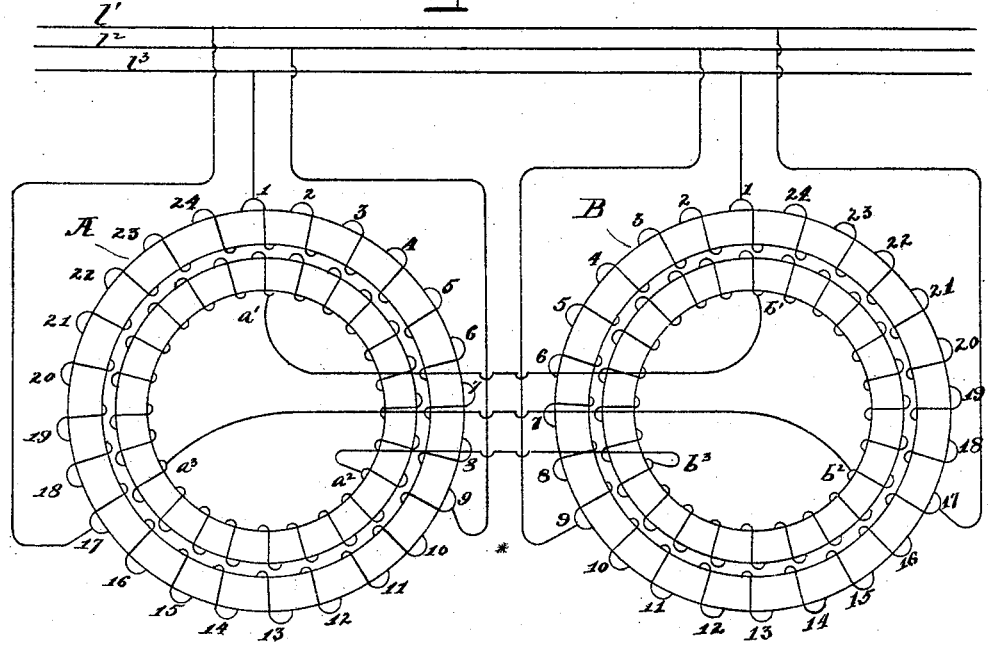
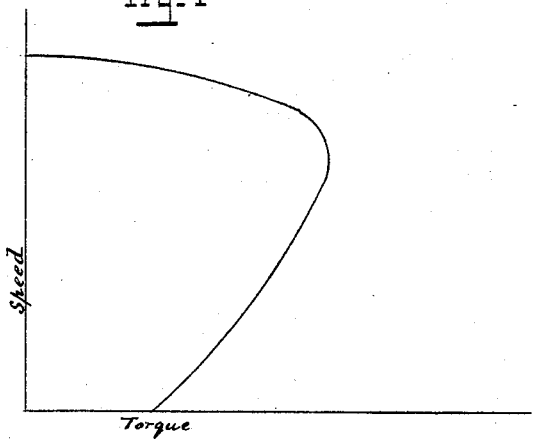
WITNESSES:
INVENTOR
Fred S. Hunting
BY Read & Price
his ATTORNEYS.

(No Model.) 2 Sheets—Sheet 2.

F. S. HUNTING.
ALTERNATING CURRENT ELECTRIC MOTOR.

No. 568,350. Patented Sept. 29, 1896.

WITNESSES:
Charles M. Catlin
C. L. Belcher

INVENTOR
Fred S. Hunting
BY
Read & Ince
his ATTORNEYS

UNITED STATES PATENT OFFICE.

FRED S. HUNTING, OF FORT WAYNE, INDIANA.

ALTERNATING-CURRENT ELECTRIC MOTOR.

SPECIFICATION forming part of Letters Patent No. 568,350, dated September 29, 1896.

Application filed August 31, 1892. Serial No. 444,660. (No model.)

*To all whom it may concern:*

Be it known that I, FRED S. HUNTING, a citizen of the United States, residing at Fort Wayne, in the county of Allen and State of Indiana, have invented certain new and useful Improvements in Alternating - Current Electric Motors; and I do hereby declare the following to be a full, clear, and exact description of the invention, such as will enable others skilled in the art to which it appertains to make and use the same.

This invention relates to alternating-current motors of that type known in the art as "rotary-current" motors, which are operated by two or more phasially-different alternating currents. In this type of motor it is usual to provide one of the elements with a coil closed upon itself and in which current is developed by induction from the rotary magnetic field developed in the other element. Such a motor tends to rotate in synchronism with the alternating current when operating under no load, but is capable of exerting but little torque when running in synchronism. This results from the fact that at synchronous speed there is no current developed in the induced circuit since no lines of force of the rotating field are cut by the coils of the induced circuit. When operating under load, however, there is a certain amount of slip between the rotary field and the induced circuit, which results in a cutting of the lines of force of said field and the generation of a secondary current varying in strength according to the amount of slip. In starting the motor this slip is ordinarily so great that the induced currents develop a magnetic strength in the armature which overpowers the poles of the rotary field. The torque is a maximum when the poles of the two members of the motor are of nearly equal strength, a condition realized a little before the motor attains synchronism. The torque in starting is far below the maximum.

It is the object of my invention to enable the torque and speed of the motor under load to be varied at will and to provide a construction by which the motor may be started into operation under load with its maximum torque.

In the accompanying drawings, which illustrate my invention, Figure 1 is a diagram showing the relation of torque to speed in motors of the kind referred to. Fig. 2 is a diagrammatic view of a motor embodying my improvements. Fig. 3 shows a detail of the apparatus.

From an inspection of Fig. 1 it will be seen that at the time of starting and until the motor attains considerable speed the torque is weak and that it attains a maximum as the motor approaches synchronism, gradually declining after such maximum is reached until the motor attains synchronism. At the instant of starting the induction created by the large amount of slip is so great as to develop poles in the armature which overpower the poles of the rotary field. By interposing resistance in the induced circuit and varying this resistance when the motor is starting the strength of the armature-poles may be weakened and the torque increased; but such a system is inefficient by reason of the waste of energy in overcoming the resistance. I accomplish the same result in a more efficient manner by the construction illustrated in Fig. 2. Referring to said figure, $1'\ 1^2\ 1^3$ represent three supply-wires of a triphase alternating-current circuit.

A B represent two motor elements in which a rotary magnetic field is developed by connection with the supply-wires at three points of its winding.

$a'\ a^2\ a^3$ and $b'\ b^2\ b^3$ represent three points of connection with closed circuits placed in inductive relation to the rotary field of the elements A B, and, as shown in the diagram, inclosing a ring-core adapted to rotate within the elements A B.

It is evident that if the points of connection of the three wires connected with the element A be shifted slightly with reference to those connected with element B the poles of the rotary field established in A may be given a lead over the poles established in element B. Now if the induced circuits be mounted upon the same shaft and similar points of the induced circuit be connected together, as shown in the drawings, the electromotive forces developed in one may be made coördinate in phase with those developed in the other, or may be made to differ in phase by any desired amount accordingly as the poles of the rotary fields pass the points $a'\ a^2\ a^3$ and $b'\ b^2\ b^3$ at the same time or at different times; that is to say, if the supply-wires of elements A and B be connected with points 1, 9, and 17 of the respective windings the electromotive forces induced in the two secondary circuits will be coördinate in phase and will directly oppose one another, so that no current will flow in the secondary circuit, and a minimum torque will be developed. If the points of connection of A be shifted to the points 2, 10, and 18 of its winding, its poles will then lead the poles of B and the induced electromotive forces in the two secondary circuits will differ in phase, permitting the passage of some current through the secondary circuit, thus developing secondary poles and increasing the torque. By shifting the points of connection of the supply-wires still further a greater amount of current will pass in the secondary circuit and still greater torque will be developed.

A simple organization, such as shown in Fig. 3, may be adopted to shift the poles. The several parts of the winding on element A are tapped like a Gramme ring and the connections led to a commutator against which bears three insulated brushes connecting with the line-wires and mounted on a journal so as to shift the brushes into contact with different parts of the winding. In this manner the points of connection may be shifted until the electromotive force of one induced circuit will lag a half a wave behind the electromotive force of the other induced circuit, when the two will act in conjunction and a maximum armature magnetization will be developed. Thus by shifting the points of connection of one motor-circuit with reference to the other I can develop any desired current in the secondary and regulate the torque and speed of the motor. It is evident that the same result will be attained by shifting one ring A bodily with reference to the other B while the points of connection remain intact; or if the induced member were stationary that a shifting of its points of connection $a'\ a^2\ a^3$ or $b'\ b^2\ b^3$ would produce a similar effect, as in all these cases the secondary electromotive forces can be adjusted in phase so as to be in conjunction, opposition, or differential, and having the same period, because they are both influenced by the same supply-circuit, they will act together to regulate the strength of current flowing in the secondary circuit.

It will of course be understood that any style of winding may be used accordingly as a two-pole or multipolar machine is desired. The winding shown is of the closed-coil bipolar type. A convenient winding for multipolar machines is that described in patent of Müller, No. 331,726, dated December 1, 1885, the commutator therein shown and the connections being of course omitted and the supply-circuit connected at three equidistant points with the winding.

Having thus described my invention, what I claim as new, and desire to secure by Letters Patent, is—

1. An alternating-current motor having a closed secondary circuit and means for varying the phases of the electromotive forces developed in different parts of said circuit.

2. A differential-phase alternating-current motor having inducing and induced members, the latter containing two interconnected windings and means for varying the phases of the alternating electromotive forces developed in the two windings and thereby varying the induced current and regulating the torque and speed.

3. A differential-phase alternating-current motor provided with an induced armature-circuit, part of which is inductively related to one rotary field and part to another rotary field, and means for varying the phases of the electromotive forces induced in the two parts by shifting the poles of one field with relation to the other.

4. A differential-phase alternating-current motor provided with two armatures inductively related to independent fields, interconnection between the armature-windings and means for shifting the poles of one field relatively to those of the other.

5. A differential-phase alternating-current motor provided with two armatures mounted on the same shaft and inductively related to independent rotary fields, interconnections between the two armature-circuits and means for varying the angular position of the field-poles with relation to the points of interconnection.

In testimony whereof I affix my signature in presence of two witnesses.

FRED S. HUNTING.

Witnesses:
A. L. HADLEY,
ALVA L. SEARLES.